US008797988B2

(12) United States Patent
Natarajan et al.

(10) Patent No.: US 8,797,988 B2
(45) Date of Patent: Aug. 5, 2014

(54) RESOURCE ALLOCATION METHODS AND USE THEREOF FOR SOUNDING REFERENCE SIGNALS IN UPLINK

(75) Inventors: Balamurali Natarajan, Karnataka (IN); Rajeev Agrawal, Glenview, IL (US); Suresh Kalyanasundaram, Karnataka (IN)

(73) Assignee: Nokia Siemens Networks Oy, Espoo (FI)

( * ) Notice: Subject to any disclaimer, the term of this patent is extended or adjusted under 35 U.S.C. 154(b) by 64 days.

(21) Appl. No.: 13/550,899

(22) Filed: Jul. 17, 2012

(65) Prior Publication Data
US 2013/0229989 A1 Sep. 5, 2013

(30) Foreign Application Priority Data
Mar. 2, 2012 (IN) .............................. 616/DEL/2012

(51) Int. Cl.
*H04W 72/04* (2009.01)
(52) U.S. Cl.
CPC .................................. *H04W 72/042* (2013.01)
USPC .......................................... 370/329; 455/451
(58) Field of Classification Search
CPC ... H04W 72/04; H04W 72/042; H04L 5/0048
USPC .................. 370/329; 455/450, 451, 452.1
See application file for complete search history.

(56) References Cited

U.S. PATENT DOCUMENTS

| 2009/0181687 A1* | 7/2009 | Tiirola et al. ............... 455/450 |
| 2010/0040036 A1* | 2/2010 | Ofuji et al. .................. 370/344 |
| 2011/0171964 A1* | 7/2011 | Lin et al. ..................... 455/450 |
| 2011/0286548 A1* | 11/2011 | Robert Safavi et al. ...... 375/295 |
| 2012/0257582 A1* | 10/2012 | Damnjanovic et al. ........ 370/329 |
| 2013/0044713 A1* | 2/2013 | Suh et al. ..................... 370/329 |
| 2013/0194908 A1* | 8/2013 | Gao et al. ..................... 370/203 |

FOREIGN PATENT DOCUMENTS

| EP | 2124469 A1 | 11/2009 |
| WO | WO 2011/162519 A2 | 12/2011 |
| WO | WO 2012/021139 A1 | 2/2012 |

OTHER PUBLICATIONS

3GPP TSG RAN WG1 Meeting #61bis; R1-103932; "Further Details on LTE-A Aperiodic SRS"; Motorola; Dresden, Germany, Jun. 24-Jul. 3, 2010 (5 pages).
Sesia et al., "LTE—The UMTS Long Term Evolution: From Theory to Practice", ch. 16, "Uplink Reference Signals", pp. 359-375 (2009).
3GPP TS 36.211 V10.4.0 (Dec. 2011), 3rd Generation Partnership Project; Technical Specification Group Radio Access Network; Evolved Universal Terrestrial Radio Access (E-UTRA); Physical Channels and Modulation (Release 10); Section 5.5.3 Sounding reference signal.

* cited by examiner

*Primary Examiner* — Paul H Masur
(74) *Attorney, Agent, or Firm* — Harrington & Smith (57) ABSTRACT

Apparatus, methods, and program products are presented that perform the following: allocating a set of sounding reference signal resources in a sounding reference signal resource space to a plurality of user equipment using a portioning scheme, and signaling indications of the allocated set of sounding reference signal resources to the plurality of user equipment. The portioning scheme may be a load balancing, complete partitioning, or hybrid scheme. The selection of a portioning scheme may be based on load.

22 Claims, 8 Drawing Sheets

RESOURCE ALLOCATION METHODS AND USE THEREOF FOR SOUNDING REFERENCE SIGNALS IN UPLINK

CROSS-REFERENCE TO RELATED APPLICATIONS

This application claims the benefit under 35 U.S.C. §119 of Indian Patent Application No. 616/DEL/2012, filed on Mar. 2, 2012 in India, and entitled "Resource Allocation Methods and use Thereof for Sounding Reference Signals in Uplink", the disclosure of which is hereby incorporated by reference in its entirety.

TECHNICAL FIELD

This invention relates generally to wireless communications and, more specifically, relates to sounding reference signals used in uplink.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

The following abbreviations that may be found in the specification and/or the drawing figures are defined as follows:

3GPP third-generation partnership project
BW bandwidth
CQI channel quality indicator
DL downlink (from base station to UE)
eNB evolved Node B (e.g., LTE base station)
FSS frequency-selective scheduling
LTE long term evolution
PHR power headroom report
PL pathloss
RB resource block
RRC radio resource control
SINR signal to interference plus noise ratio
SRS sounding reference signal
TDD time division duplexing
TM transmission mode
UE user equipment (e.g., mobile device)
UL uplink (from UE to base station)

Sounding Reference Signals (SRS) are transmitted by UEs to enable an eNB to perform, e.g., frequency-selective scheduling (FSS) in the uplink or TM 7/8 beamforming in TDD downlink. The bandwidth (BW) of the SRS transmitted by a UE is determined based on the UE's transmission power capability, path loss and channel coherence time. The underlying guideline is for a UE to sound (i.e., transmit SRS) using the maximum possible bandwidth within the coherence time.

The sounding signal hops onto a different frequency band in every SRS transmission opportunity. The time period of SRS transmission is set constant for all UEs. Multiple SRS resources of the same bandwidths can be multiplexed onto the same set of subcarriers by code division multiplexing (e.g., as defined by cyclic shifts). SRS resources are identified, e.g., by a combination of the following: subframe offset, transmission comb, frequency offset of the starting point; and cyclic shift of the sequence. The subframe offset indicates, e.g., a subframe within a selected time period to use for SRS transmission. For instance, if the time period (e.g., also called periodicity) is set as 5 ms (milliseconds), there are five possible subframes (one per ms) for transmission, and the subframe offset could range from zero to four. The transmission comb (0,1) indicates whether the even or odd subcarriers are used for transmitting SRS. The frequency offset of the starting point indicates on which subcarrier the SRS resources begin. For instance, if the frequency offset is four (and assuming the transmission comb is zero), the SRS resources may start at the fourth RB group (where each RB group is a set of contiguous RBs) and include every other subcarrier for the allotted bandwidth. The cyclic shift is applied by a UE to the SRS codes used to determine SRS symbols, and the cyclic shifts provide a measure of orthogonality for SRS transmissions by multiple UEs using the same SRS resources. Typically, there are up to eight possible cyclic shifts. Additional description of SRS is provided in chapter 16.6 of Sesia et al., "LTE—The UMTS Long Term Evolution: From Theory to Practice".

While the current SRS resource allocation methods are reasonable, they could be improved.

SUMMARY

The examples in this section are merely illustrative and should not be construed as being limiting.

In an exemplary embodiment, a method includes allocating a set of sounding reference signal resources in a sounding reference signal resource space to a plurality of user equipment using a portioning scheme, and signaling indications of the allocated set of sounding reference signal resources to the plurality of user equipment.

In another exemplary embodiment, an apparatus includes means for allocating a set of sounding reference signal resources in a sounding reference signal resource space to a plurality of user equipment using a portioning scheme, and means for signaling indications of the allocated set of sounding reference signal resources to the plurality of user equipment.

In a further exemplary embodiment, an apparatus includes one or more processors and one or more memories including computer program code. The one or more memories and the computer program code are configured to, with the one or more processors, cause the apparatus to perform at least the following: allocating a set of sounding reference signal resources in a sounding reference signal resource space to a plurality of user equipment using a portioning scheme, and signaling indications of the allocated set of sounding reference signal resources to the plurality of user equipment.

In an additional exemplary embodiment, a computer program product comprising a computer-readable memory medium bearing computer program code embodied therein for use with a computer, the computer program code comprising: code for allocating a set of sounding reference signal resources in a sounding reference signal resource space to a plurality of user equipment using a portioning scheme, and code for signaling indications of the allocated set of sounding reference signal resources to the plurality of user equipment.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Figure 1:
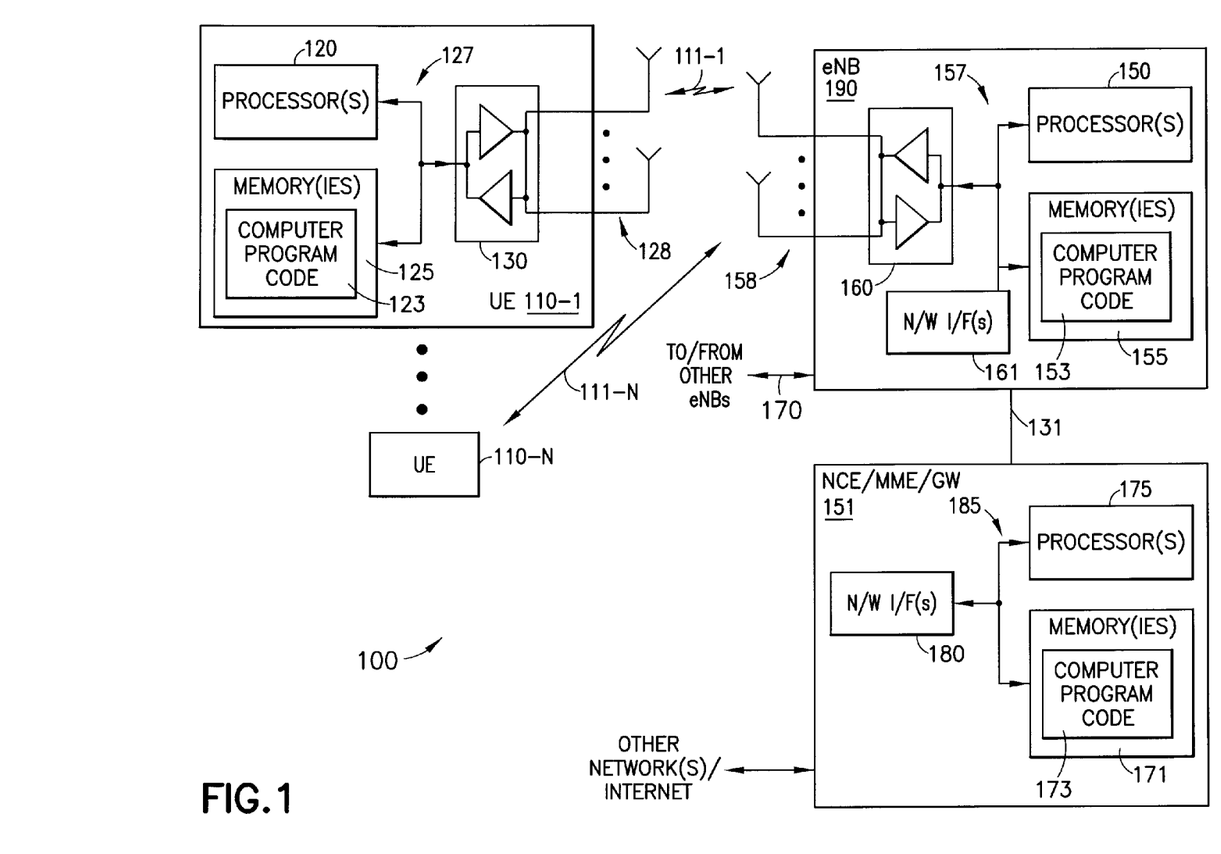
FIG. 1 is a block diagram of an exemplary system in which the exemplary embodiments may be practiced.

Before proceeding with additional descriptions of problems with current SRS allocation methods, reference is made to FIG. 1, which shows a block diagram of an exemplary system in which the exemplary embodiments may be practiced. In FIG. 1, N UEs 110-1 through 110-N are in wireless communication with a network 100 via corresponding links 111-1 through 111-N. A single UE 110-1 is described in reference to FIG. 1, and it is assumed that other UEs 110 are similar. The user equipment 110-1 includes one or more processors 120, one or more memories 125, and one or more transceivers 130 interconnected through one or more buses 127. The one or more transceivers 130 are connected to one or more antennas 128. The one or more memories 125 include computer program code 123. The one or more memories 125 and the computer program code 123 are configured to, with the one or more processors 120, cause the user equipment 110-1 to perform one or more of the operations as described herein. The UE 110-1 communicates with eNB 190 via link 111-1.

The eNB 190 includes one or more processors 150, one or more memories 155, one or more network interfaces (N/W I/F(s)) 161, and one or more transceivers 160 interconnected through one or more buses 157. The one or more transceivers 160 are connected to one or more antennas 158. The one or more memories 155 include computer program code 153. The one or more memories 155 and the computer program code 153 are configured to, with the one or more processors 150, cause the eNB 190 to perform one or more of the operations as described herein. The one or more network interfaces 161 communicate using, e.g., the links 170 and 131. Two or more eNBs 190 communicate using, e.g., link 170. The link 170 may be wired or wireless or both and may implement, e.g., an X2 interface.

The network 100 may include a network control element (NCE) 151 that may include MME/SGW (mobility management entity/serving gateway) functionality, and which provides connectivity with a further network, such as a telephone network and/or a data communications network (e.g., the Internet). The eNB 190 is coupled via the link 131 to the NCE 151. The link 131 may be implemented using, e.g., an Si interface. The NCE 151 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 151 to perform one or more operations.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The processors 120, 150, and 175 may be of any type suitable to the local technical environment, and may include one or more of general purpose computers, special purpose computers, microprocessors, digital signal processors (DSPs) and processors based on a multi-core processor architecture, as non-limiting examples.

In general, the various embodiments of the user equipment 110 can include, but are not limited to, cellular telephones such as smart phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Concerning problems with current SRS resource allocation methods, SRS code sequences of unequal lengths are derived from different Zadoff-Chu base sequences and since they are not completely orthogonal to each other, they cause mutual code interference when overlapped. That is, UEs assigned different BWs use different code base sequences. When these UEs are assigned the same SRS resources, the different SRS code base sequences effectively overlap and cause mutual code interference due to their non-orthogonality. Therefore, if UEs with different SRS BWs are multiplexed onto the same SRS bandwidth, they will experience significant mutual interference. Mutual code interference (due to either long multipath channel conditions or timing offsets) should also be minimized when identical BW UEs overlap. Additionally, SRS resource allocation algorithms need to be efficient enough to accommodate as many UEs requiring different SRS BWs as possible, while limiting or avoiding the mutual interference issues. Further, any SRS reconfiguration (e.g., due to change in SRS BW or location) is conveyed through RRC to the UE, and therefore the SRS reconfiguration needs to be minimized to reduce the required RRC messaging load.

The instant invention corrects or lessens these issues. In an exemplary embodiment, when a new uplink UE comes into the system, the new UE will be allocated uplink resources by wideband scheduling until its SRS bandwidth is determined based on the path loss estimate obtained from the UE's power headroom report (PHR). The SRS bandwidth 'BW' is determined as $BW=BW_{PL}$. $BW_{PL}$ is a maximum SRS bandwidth that can be sounded by a UE in a transmission opportunity calculated based on the UE's path loss (PL). The value of $BW_{PL}$ is rounded down to the largest allowed SRS bandwidth value in the cell (according to 3GPP standards such as 3GPP TS 36.211 V10.4.0 (2011 December), section 5.5.3) that is smaller than or equal to $BW_{PL}$. In case this SRS bandwidth is not available for allocation, then the next lower available SRS bandwidth is allocated.

In an exemplary embodiment, there is a maximum number of UEs that can be multiplexed on the same SRS resource.

This maximum number could be the same or different when UEs with identical SRS BWs and when UEs with non-identical BW values overlap. This maximum number can also be SRS bandwidth dependent. Typically, for identical bandwidth UEs, this value will be set to 8 (eight), the maximum number of cyclic shifts.

If a new UE cannot be allocated any SRS resource in the current subframe due to unavailability of an SRS resource of the required BW, the UE's SRS scheduling is postponed to the next SRS scheduling instant. Similarly, if already allocated UEs needing reconfigurations cannot be scheduled (for SRS) in the current subframe, then their SRS scheduling will be postponed to the next SRS scheduling instant.

Figure 2:
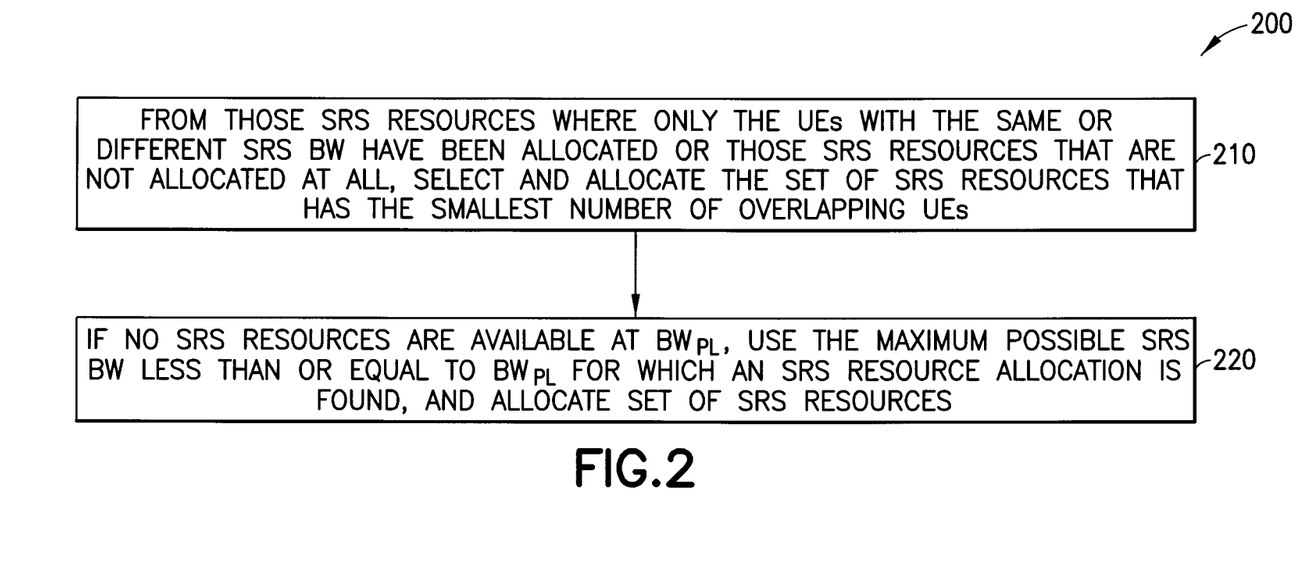
FIG. 2 is a block diagram of a flowchart for a complete load balancing scheme for SRS resource allocation.

Three exemplary, non-limiting SRS resource allocation methods are proposed below. The first exemplary method is a complete load balancing scheme for SRS resource allocation, a flowchart of which is shown in FIG. 2 as flowchart 200. Flowchart 200 may describe method operations, the operations of hardware (e.g., an integrated circuit), or operations caused by a computer program product comprising a computer-readable medium bearing computer program code embodied therein for use with a computer. Flowchart 200 is performed, e.g., by eNB 190. In the example of FIG. 2, the eNB 190 performs these blocks relative to a single UE being assigned an SRS resource.

In block 210, from those SRS resources where only the UEs 110 with the same or different SRS BW have been allocated or those SRS resources that are not allocated at all, the eNB 190 selects and allocates the set of SRS resources that has the smallest number of overlapping UEs. Overlapping UEs are those UEs having the same or different SRS BWs (and therefore use different-length SRS codes). In an exemplary embodiment, non-identical SRS BW UEs are not allowed to overlap with each other on the same SRS bandwidth resource. The SRS resources are defined, e.g., using subframe offset, comb, and frequency offset. The BW also may be used to define a set of SRS resources. For instance, in the examples of FIGS. 3, 5, and 7, BWs of 4, 8, 16, and 48 are used. It is noted that any available cyclic shift (e.g., of the typical maximum of 8 possible cyclic shifts) that are not already allocated in the SRS resource for the same BW UEs could be allocated.

In block 220, if no SRS resources are available at $BW_{PL}$, the eNB 190 uses the maximum possible SRS BW less than or equal to $BW_{PL}$ for which an SRS resource allocation is possible, and allocates the corresponding set of SRS resources.

It is noted that allocations for multiple UEs are performed by performing blocks 210 and 220 for each UE. Each UE could be selected randomly or selected, e.g., via a round-robin technique or based on some UE priority.

Figure 3:
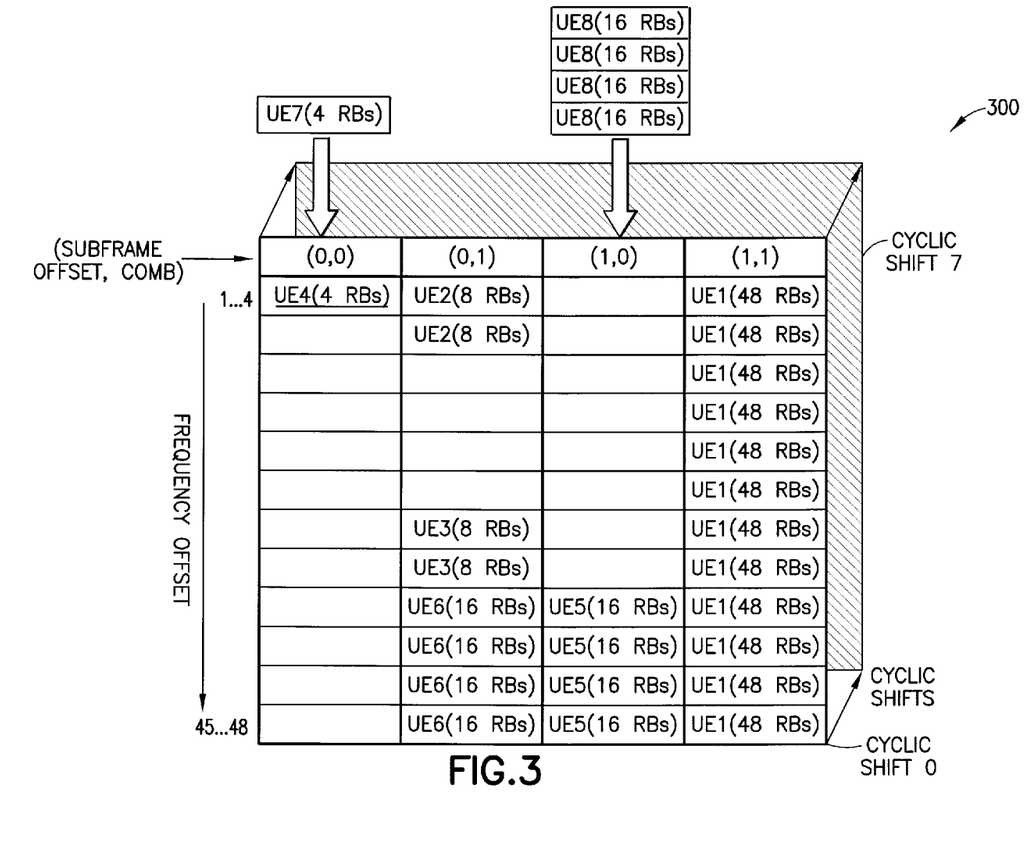
FIG. 3 is an illustration of an SRS resource space and how two UEs are mapped into the resource space based on the flowchart of FIG. 2.

An example is presented in FIG. 3, which is an illustration of an SRS resource space 300 and how two UEs are mapped into the resource space based on the flowchart of FIG. 2. The resource space 300 is exemplary and used for ease of description. The time period (also called "periodicity") is 2 ms, which presents two opportunities for SRS transmission, one opportunity for each 1 ms subframe. Therefore, there are two subframe offsets, where zero (0) indicates the first 1 ms subframe and one (1) indicates the second 1 ms subframe. There are two combs, indicated by zero (0) (e.g., indicating even subcarriers) and one (1) (e.g., indicating odd subcarriers). In this example, the SRS bandwidth in a single transmission opportunity is at least 4 RBs. Note that each RB corresponds to 12 contiguous subcarriers (out of which only 6 of them—either even or odd subcarriers as determined by the comb—are used for SRS transmission in a SRS resource) in this example.

The frequency offset ranges from 1 ... 4 to 45 ... 48, as four RBs are the minimum allocable block of SRS resources in this example. If one considers that the subframe offset, frequency comb, and frequency offset are three dimensions, then the cyclic shift is a fourth dimension. This fourth dimension is illustrated by arrows pointing into the figure. There are, in this example, eight possible cyclic shifts zero through seven, of which only cyclic shift zero and seven are shown.

Based on FIG. 2, two new UEs, UEs 7 and 8, are allocated totally unused SRS resources (block 210 of FIG. 2). UE 7, which is a 4 RB BW UE, is allocated 4 RBs from any of the unoccupied 4 RB SRS resources in any of the (subframe offset, comb) combinations. Note that this excludes the subframe combination (1,1), as this combination defines resources that are fully occupied by a 48 RB UE.

Figure 4:
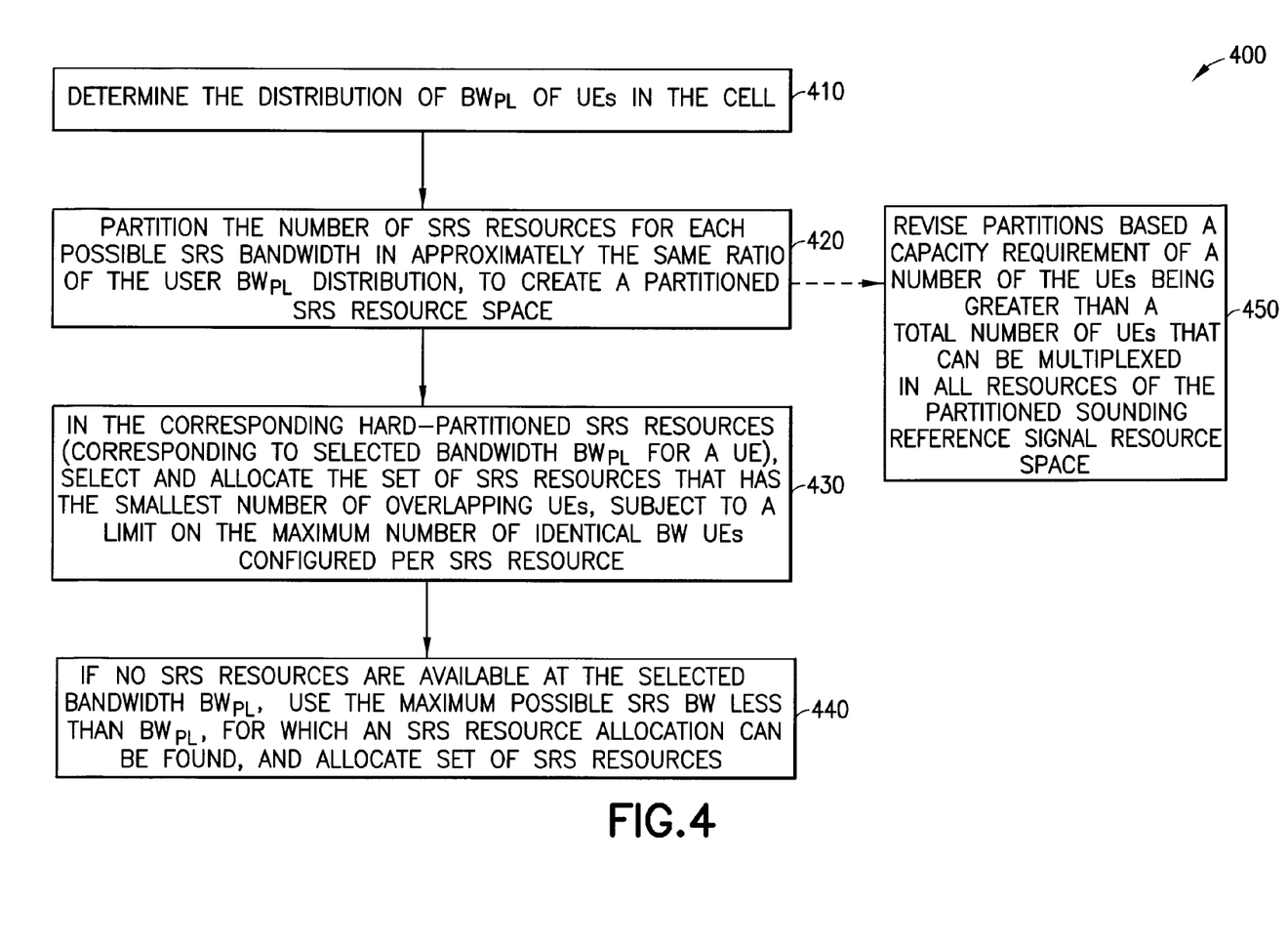
FIG. 4 is a block diagram of a flowchart for a complete partitioning scheme for SRS resource allocation.

The second technique for an SRS resource allocation method is a complete partitioning scheme. FIG. 4 is a block diagram of a flowchart 400 for a complete partitioning scheme for SRS resource allocation. Flowchart 400 may describe method operations, the operations of hardware (e.g., an integrated circuit), or operations caused by a computer program product comprising a computer-readable medium bearing computer program code embodied therein for use with a computer. Flowchart 400 is performed, e.g., by eNB 190. In the example of FIG. 4, the eNB 190 performs these blocks relative to a single UE being assigned an SRS resource.

In block 410, the eNB 190 determines the distribution of $BW_{PL}$ of UEs in the cell. This distribution can be obtained based on the path loss distribution of UEs from past history, field data, and the like. The distribution could also be "learnt" in real-time from the observed distribution.

In block 420, the eNB 190 partitions the number of SRS resources for each possible SRS bandwidth in approximately the same ratio of the user $BW_{PL}$ distribution. For example, let the possible SRS bandwidths configured in the cell be 4, 8, 16, and 48 RBs. Let the corresponding UE distribution be in the ratio of 2:1:1:1 respectively. Let the SRS transmission period be set to 5 ms for all UEs. Since there are five possible subframe offsets with two transmission combs each, there are a total of 5*2=10 possible orthogonal SRS BW allocations of 48 RBs each (ignoring cyclic shifts as only the same BW UEs can overlap, in an exemplary embodiment, in a SRS resource, each of them using a different cyclic shift).

Assume the number of SRS resources reserved for 48 RB SRS UEs is x. Then according to the UE distribution, the number of 16 RB resources needed for 16 RB UEs is also x. But this can be achieved by assigning 16 RB UEs with x/3 48 RB resources. Similarly, the needs of 8 RB UEs can be met with x 8 RB resources, which correspond to x/6 48 RB resources. The needs of 4 RB UEs can be met with 2x 4 RB resources, which correspond to 2x/12=x/6 48 RB resources. The total available 10 orthogonal 48 RB SRS BWs are allocated in the ratio of x/6:x/6:x/3:x for 4, 8, 16 and 48 RB UEs, respectively.

Therefore, the number of 48 RB SRS BWs allocated is in the ratio of 1:1:2:6 for 4, 8, 16 and 48-RB UEs respectively. This means that one 48 RB resource is reserved for 4 RB UEs, another 48 RB resource is set aside for 8 RB UEs, 2 48 RB resources are set aside for 16 RB UEs, and 6 48 RB resources are set aside for 48 RB UEs. This partitioning creates a partitioned SRS resource space.

In block 430, In the corresponding "hard-partitioned" (i.e., partitioned as in block 420) SRS resources (and corresponding to a UE with a selected SRS BW, e.g., selected using $BW_{PL}$), the eNB 190 selects a set of SRS resources that has the smallest number of overlapping UEs, subject to a limit on the maximum number of identical BW UEs configured per SRS resource. The limit is previously mentioned and is based on the number (e.g., 8) of cyclic shifts available. That is, the intention is also to not overlap with many identical BW UEs in the same SRS resources. Though the mutual code interference will be less with identical BW UEs, the interference should still be limited as much as possible. So, within a partition of SRS resources for a particular BW, it is desirable not to overlap many UEs on a single SRS resource.

In block 440, if no resources are available at the selected bandwidth $BW_{PL}$, the eNB 190 uses the maximum possible SRS BW less than $BW_{PL}$ for which a resource allocation (e.g., a set of SRS resources) can be found, and allocates the set of SRS resources.

It is noted that allocations for multiple UEs are performed by performing blocks 430-440 for each UE. Each UE could be selected randomly or selected, e.g., via a round-robin technique or based on some UE priority. Block 450 is described below.

Figure 5:
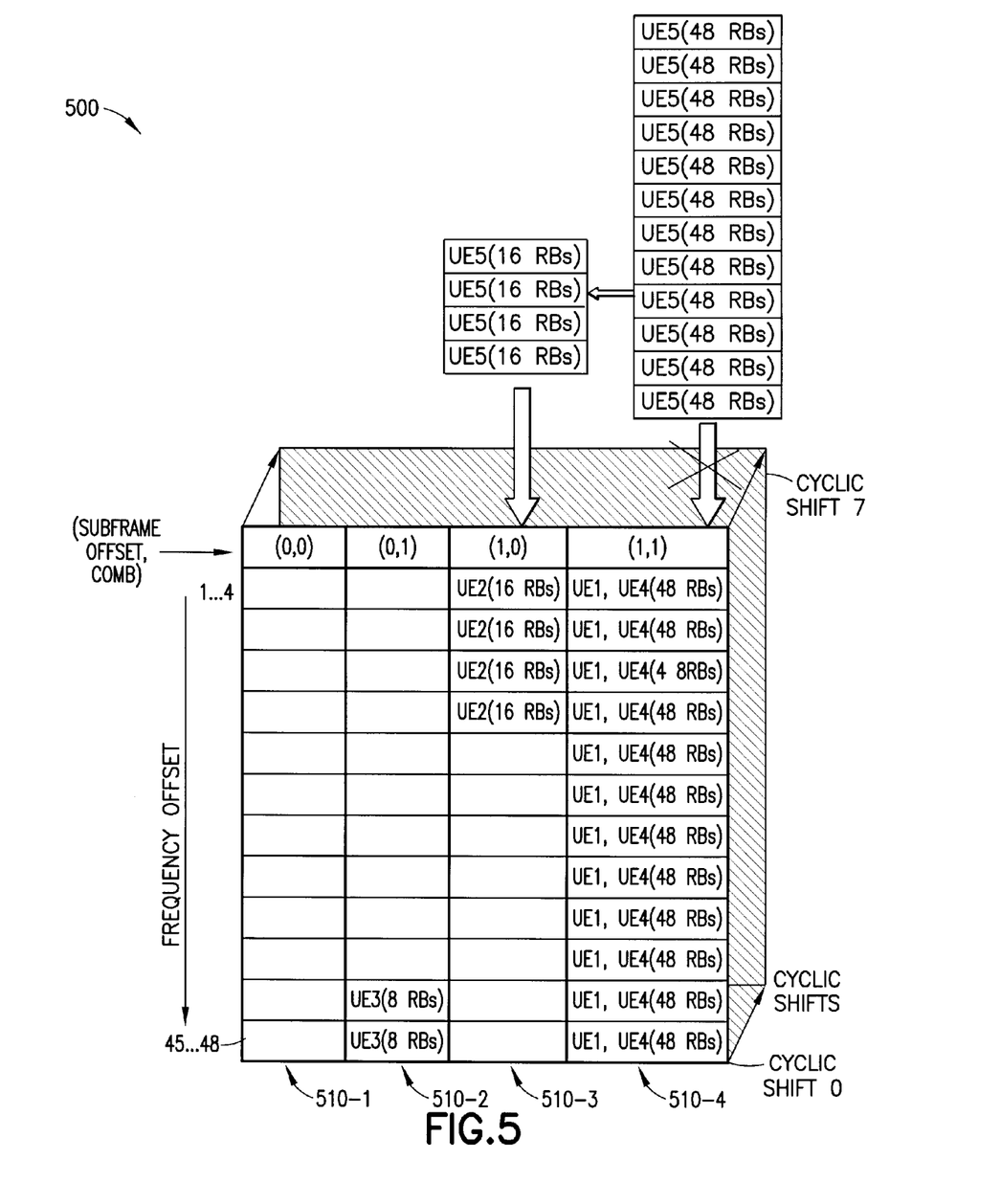
FIG. 5 is an illustration of an SRS resource space and how a UE is mapped into the resource space based on the flowchart of FIG. 4.

An example is presented in FIG. 5, which is an illustration of a (partitioned) SRS resource space 500 and how a UE is mapped into the resource space based on the flowchart of FIG. 4. SRS resource spaces 300 and 500 are similar, and only differences are described herein. Each 48-RB SRS resource 510-1, 510-2, 510-3, and 510-4 (corresponding to subframe offset and transmission combs of (0,0), (0,1), (1,0), and (1,1), respectively) in this example is reserved for (e.g., partitioned to) each of the four possible SRS bandwidths (4, 8, 16, and 48 RBs respectively). That is, the 48-RB SRS resource 510-1 is reserved for SRS BW of 4; the 48-RB SRS resource 510-2 is reserved for SRS BW of 8; the 48-RB SRS resource 510-3 is reserved for SRS BW of 16; and the 48-RB SRS resource 510-4 is reserved for SRS BW of 48. Assume only a maximum of two UEs are allowed to be multiplexed onto the same set of SRS resources.

The SRS resource for the new UE5 requiring 48 RBs cannot overlap with that of UEs 1,4 because there can only be a maximum of two UEs multiplexed onto the same SRS resource. See block 430 of FIG. 4. Though the first 48-RB SRS resource 510-1 is totally unused, since this set of resources is reserved for 4 RB UEs, the 48 RB allocation for this UE cannot be allocated there. The 48 RB allocation also cannot be allocated (in an example) to the second and third 48 RB resources 510-2 and 510-3, respectively, since these are reserved for 8 RB UEs and 16 RB UEs, respectively. Hence, the SRS BW of UE5 is reduced to the next lower possible BW value of 16 and allocated from the third 48 RB resource 510-3 reserved for 16 RB UEs. See block 440.

Figure 6:
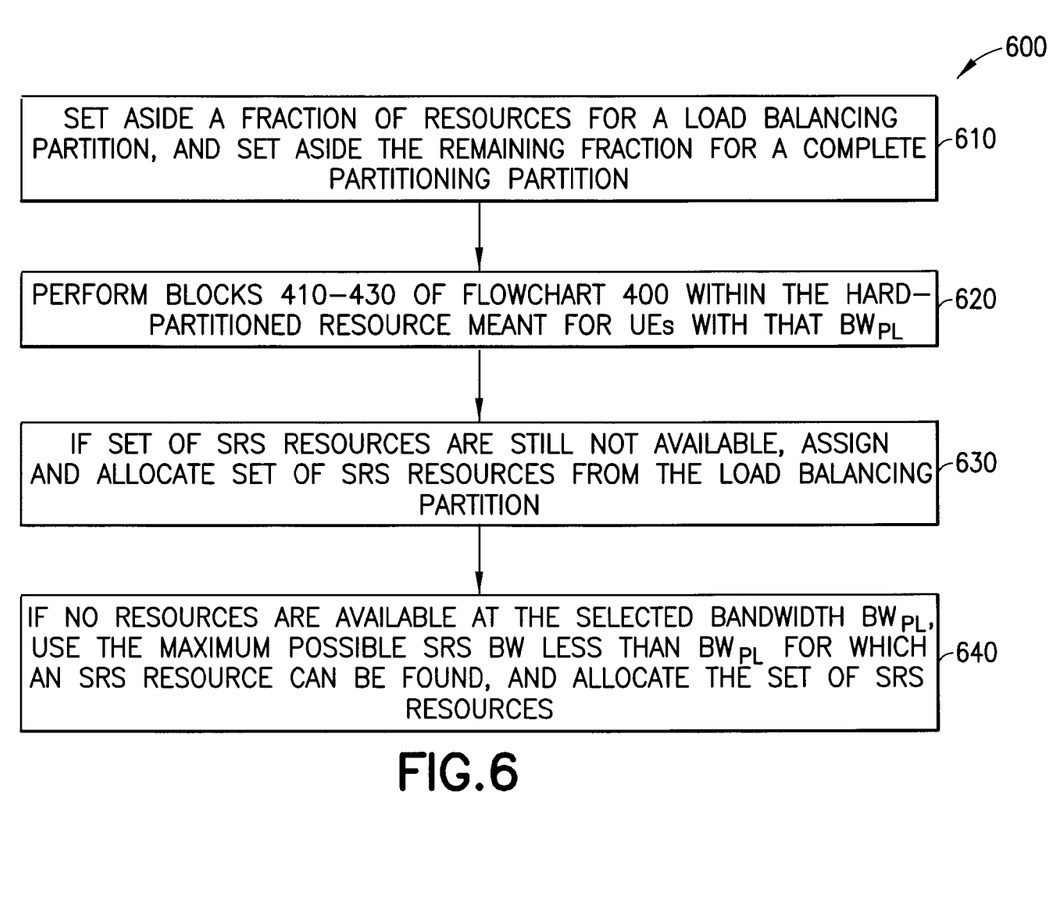
FIG. 6 is a block diagram of a flowchart for a hybrid scheme for SRS resource allocation.

A third example of an SRS resource allocation method is a hybrid scheme. Turning to FIG. 6, a block diagram is shown of a flowchart 600 for a hybrid scheme for SRS resource allocation. Flowchart 600 may describe method operations, the operations of hardware (e.g., an integrated circuit), or operations caused by a computer program product comprising a computer-readable medium bearing computer program code embodied therein for use with a computer. Flowchart 600 is performed, e.g., by eNB 190. In the example of FIG. 6, the eNB 190 performs these blocks relative to a single UE being assigned an SRS resource.

In block 610, the eNB 190 sets aside a fraction of resources for a load balancing (see FIGS. 2 and 3) partition, and sets aside the remaining fraction for a complete partitioning (see FIGS. 4 and 5) partition. In an exemplary embodiment, any SRS BW UE is allocated an SRS resource in the load balancing partition if there are no SRS resources available in a corresponding hard-partitioned portion of the complete partitioning partition. In an exemplary embodiment, non-identical SRS BW UEs are not allowed to overlap with each other on the same SRS bandwidth resource in the load balancing partition. This implementation may also follow a first-come-first-served policy.

In block 620, the eNB 190 performs block 430 of flowchart 400 within the hard-partitioned resource 510 (see FIG. 5) meant for UEs with that $BW_{PL}$ (e.g., the $BW_{PL}$ of the UE). In block 630, the eNB 190 determines if a set of SRS resources is still not available in the complete partitioning partition, and, if so, assigns and allocates a set of SRS resources from the load balancing partition. In block 640, the eNB 190 determines if no resources are available at the selected bandwidth $BW_{PL}$. If there are no SRS resources available, the eNB 190 uses the maximum possible SRS BW less than $BW_{PL}$ for which an SRS resource can be found and allocates the corresponding set of SRS resources. For block 640, there can be multiple different options depending on implementation. One could repeat the same process as above, i.e., start with the hard-partitioned resource space and then move on to the load balancing partition if the resource is not available. However, one could also start with the load balancing partition then move onto the hard-partitioned resource space.

It should be noted that blocks 620 and 630 can be swapped. For instance, block 620 could entail allocating SRS resources from the load balancing partition unless no suitable set of SRS resources is found. That is, block 210 could be performed. Block 630 could entail performing block 430 of flowchart 400 within the hard-partitioned resource meant for UEs with that $BW_{PL}$.

It is noted that allocations for multiple UEs are performed by performing blocks 620-640 for each UE. Each UE could be selected randomly or selected, e.g., via a round-robin technique or based on some UE priority.

Figure 7:
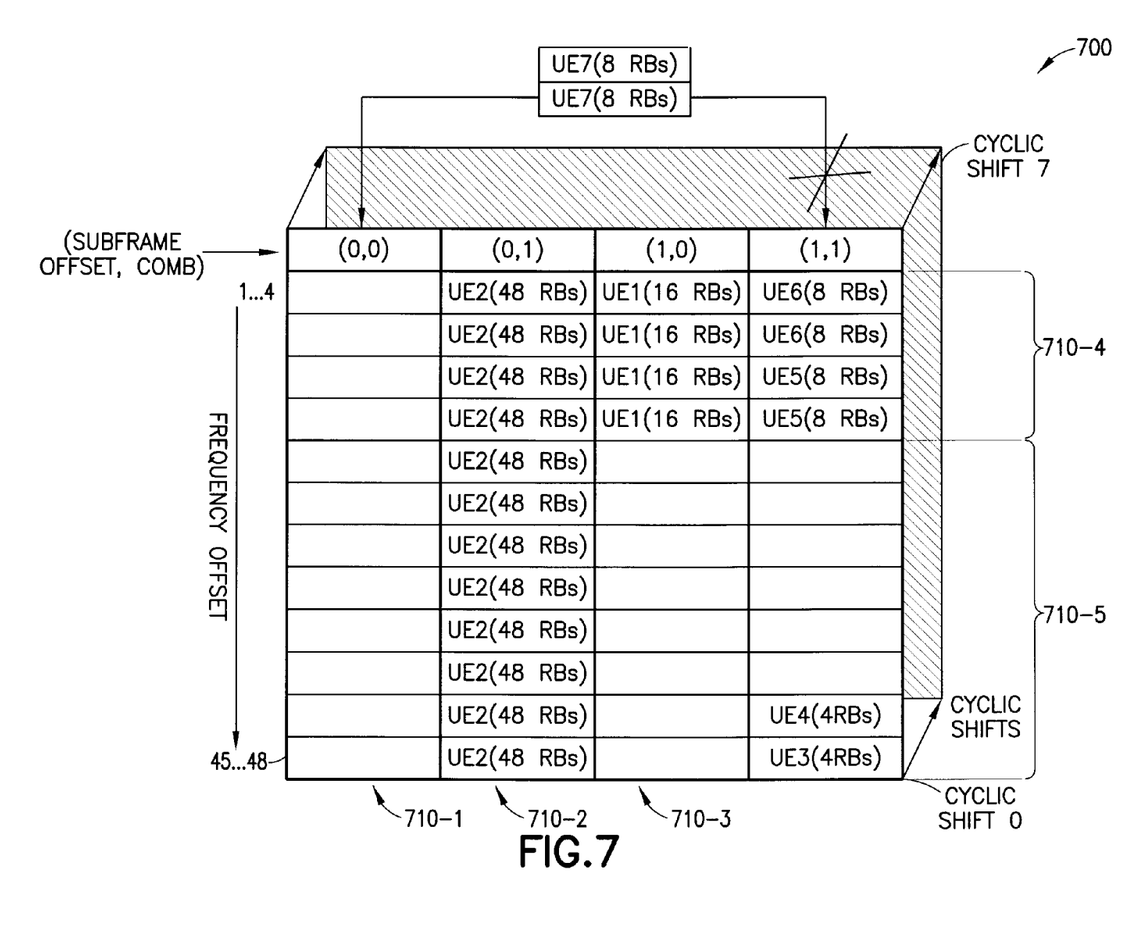
FIG. 7 is an illustration of an SRS resource space and how one UE is mapped into the resource space based on the flowchart of FIG. 6.

An example of flowchart 600 is shown in FIG. 7, which is an illustration of an SRS resource space 700 and how one UE is mapped into the resource space 700 based on the flowchart of FIG. 6. The load balancing partition is the set of resources 710-1. The complete partitioning partition is the set of resources 710-2, 710-3, 710-4, and 710-5, reserved for 48-RB BW, 16 RB BW, 8 RB BW, and 4 RB BW, respectively. Assume only a maximum of one UE is allowed to be multiplexed onto the same set of SRS resources. UE 7 requires 8 RBs. However, there are no any available SRS resources unused in reserved hard-partition 710-4, as UEs 5 and 6 have already been allocated to the 8 RB resources in the partition 710-4. Hence, UE 7 is allocated resources from the unreserved load balancing partition. See block 630 of FIG. 6.

For the techniques presented above, when the eNB 190 allocates SRS resources for each BW partition in the resource space (e.g., 500/700), the eNB 190 could spread the BW partition to as many subframe offsets as possible, i.e., the eNB 190 configures the SRS resources of a partition in as many subframe offsets as possible. This is to avoid collision of CQI and SRS transmission subframe offsets for a UE. Whenever such a collision happens, SRS transmission is dropped by the UE. So in this embodiment, maximum chance is provided to allocate an SRS resource from another subframe offset that does not collide with the UE's CQI subframe offset. This technique is applicable to the complete partitioning scheme and to the hybrid scheme, but only for the partitioned resource space. This is an RB allocation enhancement for each of the partitions. For example, if the 16 RB BW partition has 48 RBs, then 16 RBs can be allocated in each of the (0,0), (0,1) and (1,0) (subframe offset, comb) combinations. For the 48 RB partition, this is not possible as there are only 48 RBs allowed in that partition and all of them have to be allocated contiguously in a (subframe offset, comb) combination.

There are a number of possible enhancements to these resource allocation techniques. Certain exemplary possible enhancements are described below.

If SRS resources are not available even after following all the operations in the above mentioned the exemplary SRS resource allocations from FIGS. 2, 4, and 6, then if possible, select one of the SRS resources that has the least number of already configured UEs with SRS bandwidths other than this UE's SRS BW, subject to the maximum limits on the number of UEs having identical and non-identical BWs.

When choosing an unused free resource, if there are multiple choices, select the SRS resource that causes the least fragmentation of the RB space in frequency (on a particular subframe and transmission comb) for SRS allocation. This will ensure more free unused resources and hence low mutual interference for larger bandwidth SRS allocations for subsequent UEs.

In some scenarios, it may be better for the UE to be allocated a smaller bandwidth allocation, if, at a larger bandwidth allocation, the interference is larger because of a larger number of UEs getting multiplexed. In general, the bandwidth allocation is made to be a function of both the bandwidth and the number of UEs multiplexed on the resource allocated to the user. So, the allocated bandwidth is picked such that this function is optimized.

In heavily loaded scenarios, the UE distribution assumed for the complete partitioning scheme can be slightly revised in favor of smaller SRS bandwidths to accommodate a larger number of UEs in the SRS resource space. This is now described by extending the examples in FIGS. 4 and 5 in the following manner (see block 450 of FIG. 4).

The final SRS resource distribution obtained (measured in terms of 48 RBs) is 1:1:2:6 for 4, 8, 16 and 48-RB UEs respectively. Therefore, 12 4-RB SRS resources (total of 48) for 4-RB UEs, 6 8-RB SRS resources (total of 48) for 8-RB UEs, 6 16-RB SRS resources (total of 96, or 2 times 48) for 16-RB UEs, and 6 48-RB resources for 48-RB UEs are set aside in their corresponding SRS RB partitions. Assuming a maximum of 8 UEs can be multiplexed on each SRS resource (via 8 possible cyclic shifts), the total number of UEs that can be multiplexed in all resources will be 8*(12+6+6+6)=240 UEs.

Suppose the SRS UE capacity requirement is 280, then the final SRS resource distributions (in the partitions) can be revised (block 450) slightly from 12:6:6:6 to 12:6:6+3x:6-x where x is determined in order that the UE capacity is met. Assuming this revised SRS resource distribution, the total number of UEs that can be multiplexed is 8*(12+6+6+3x+6−x)=8*(30+2x)=240+16x. 240+16x>280=>16x>40, x=3. Three SRS resources from the 48-RB SRS BW partition are moved to the 16-RB SRS BW partition. So, the final SRS BW partition distribution is 12:6:15:3.

This exercise can be repeated with the other partitions if the UE SRS resource capacity requirement is still not met. So the partition sizes obtained from the ideal UE SRS BW distribution can be revised slightly to meet the UE capacity requirement. This is performed by increasing the number of SRS resources allocated to the smaller SRS BW partitions at the expense of larger SRS BW partitions. This revision is a tradeoff, as the revision forces some of the UEs to be configured at lower SRS BWs than their $BW_{PL}$ values.

Figure 8:
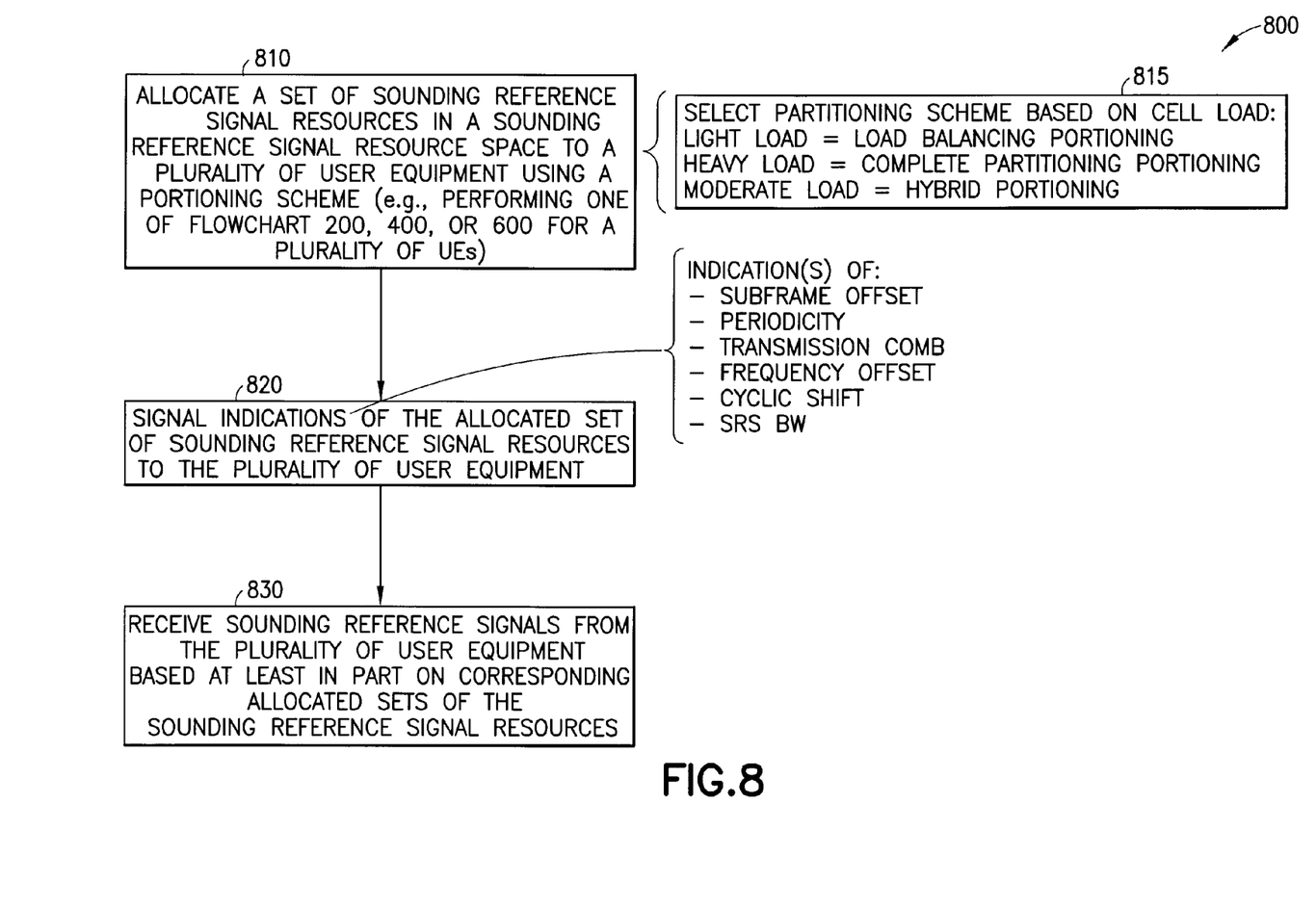
FIG. 8 is a block diagram of a flowchart for performing SRS resource allocation of a plurality of UEs.

Referring now to FIG. 8 is a block diagram of a flowchart 800 for performing SRS resource allocation of a plurality of UEs. Flowchart 800 may describe method operations, the operations of hardware (e.g., an integrated circuit), or operations caused by a computer program product comprising a computer-readable medium bearing computer program code embodied therein for use with a computer. Flowchart 800 is performed, e.g., by eNB 190. In block 810, the eNB 190 allocates a set of sounding reference signal resources in a sounding reference signal resource space to a plurality of user equipment using a portioning scheme. The portioning scheme may be, one of the flowcharts 200, 400, or 600, performed for a plurality of UEs 110. Block 815 is described below. In block 820, the eNB 190 signals indications of the allocated set of sounding reference signal resources to the plurality of user equipment. The indications may include, as examples, one or more of the following: —subframe offset; periodicity (e.g., a time period); transmission comb; frequency offset; cyclic shift; or SRS BW (e.g., 4, 8, 16, or 48 RBs in the examples presented above). There may also be other signaling of indications, such as the maximum SRS bandwidth in the cell, sets of subframes in which SRS may be transmitted in the cell, frequency hop size, whether the SRS is single or periodic, and the like. In block 830, the eNB 190 receives sounding reference signals from the plurality of user equipment based at least in part on corresponding allocated (e.g., and signaled) sets of the sounding reference signal resources.

There are a number of possible use cases, of which some are presented below. The technique of the load balancing scheme (e.g., FIG. 2), which performs load-balancing on all the available SRS resources, can be used under light load. See block 815 of FIG. 8. There is no problem of getting locked-in at an undesirable partition of resources.

Under heavy load, there is a good possibility that newly connected UEs may not receive any SRS resources due to higher bandwidth UEs already occupying all the available SRS resources. In these cases, the complete partitioning of FIG. 4 will prove useful. See block 815 of FIG. 8.

The hybrid scheme can provide a middle ground between the load balancing and complete partitioning schemes, and can be useful in moderately loaded systems. See block 815 of FIG. 8. The hybrid scheme allows for some error tolerance to the assumed UE SRS BW distribution in the cell.

Exemplary benefits of the exemplary embodiments include one or more of the following non-limiting benefits.

These techniques provide efficient SRS resource packing algorithms. These techniques can avoid high mutual code interference by reducing the number of UEs configured on a SRS resource. The techniques can provide better utilization of the SRS resource space as the techniques avoid RB fragmentation.

These techniques can avoid getting locked-in to scenarios where UEs with a certain bandwidth requirement end up using a larger fraction of resources. For example, this avoids the situation wherein the first few large SRS BW UEs occupy the entire SRS resource space, thereby resulting in the reduction of SRS capacity and the throughput performance.

These techniques can allocate the largest possible bandwidth allocation as determined by the UE's pathloss estimate, thus resulting in better and more current SINR estimates for UL FSS. These also may result in reduction of the need for SRS reconfigurations, thereby decreasing the RRC load.

The techniques may provide different resource allocation algorithms for different cell-loading scenarios.

Thus, exemplary embodiments presented above may partition the number of SRS resources (e.g., indicated by subframe offset, comb, freq offset) for each possible SRS bandwidth in approximately the same ratio of the user $BW_{PL}$ distribution in a complete provisioning example. In addition, the partition sizes may be determined such that the desired maximum SRS capacity is met. This is performed by converting some of the higher bandwidth resources to lower bandwidth resources.

In an exemplary embodiment, the SRS bandwidth allocation is attempted at the largest possible bandwidth that can be allocated to the UE based on the UE's pathloss. But when resources are not available, the next lower bandwidth allocation is attempted, and so on. In an exemplary embodiment, load balancing may be performed within the resources meant for the particular partition. The exemplary embodiments may realize a given partition of resources such that the fragmentation is minimized, i.e., by giving similar bandwidth resources as adjacent frequency offsets as much as possible, and by allocating resources from one end progressively (e.g., in the load balancing example presented above).

Embodiments of the present invention may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memory 125, 155, 171 or other device) that may be any media or means that can contain or store the instructions for use by or in connection with an instruction execution system, apparatus, or device, such as a computer.

The following are exemplary items of what has been presented above. 1. A method includes: allocating a set of sounding reference signal resources in a sounding reference signal resource space to a plurality of user equipment using a portioning scheme; and signaling indications of the allocated set of sounding reference signal resources to the plurality of user equipment.

2. The method of item 1, wherein the portioning scheme comprises a load balancing portioning scheme.

3. The method of item 2, wherein allocating further comprises allocating, from those sounding reference signal resources where only user equipment having a same sounding reference signal bandwidth have been allocated from the sounding reference signal resource space or those sounding reference signal resources that are not allocated at all from the sounding reference signal resource space, a set of sounding reference signal resources, for a selected one of the plurality of user equipment and from the sounding reference signal resource space, that has a smallest number of user equipment having the same sounding reference signal bandwidths.

4. The method of item 3, wherein allocating further comprises, if no sounding reference signal resources are available at a pathloss bandwidth corresponding to pathloss for the selected user equipment, using a maximum possible sounding reference signal bandwidth less than or equal to the pathloss bandwidth for which a sounding reference signal resource allocation is found, and allocating for the selected user equipment the set of sounding reference signal resources corresponding to the found allocation.

5. The method of item 2, wherein the sounding reference signal resource space is partitioned into a first partition for load balancing and multiple second partitions for complete partitioning, and wherein allocating further comprises allocating a set of sounding reference signal resources for a selected one of the plurality of user equipment from the one of the multiple second partitions unless no suitable set of sounding reference signal resources is found, and responsive to no suitable set of sounding reference signal resources being found in one of the multiple second partitions, allocating a set of sounding reference signal resources for the selected user equipment from the load balancing partition.

6. The method of item 5, wherein:
the multiple second partitions are partitioned based on a number of possible sounding reference signal bandwidths; and
allocating further comprises, from one of the second partitions corresponding to a selected sounding reference signal bandwidth associated with the selected user equipment, selecting and allocating for the selected user equipment a set of sounding reference signal resources that has a smallest number of user equipment having previously allocated sounding reference signal bandwidths that are the same, subject to a limit on a maximum number of identical bandwidth user equipment configured per sounding reference signal resource.

7. The method of item 5, further comprising:
determining a distribution of pathloss sounding reference signal bandwidths of user equipment, the pathloss sounding reference signal bandwidths based on pathloss of individual ones of the user equipment; and
determining the multiple second partitions at least by partitioning, in the sounding reference signal resource space, a number of sounding reference signal resources for each possible sounding reference signal bandwidth in approximately a same ratio of the distribution of the pathloss bandwidths.

8. The method of item 7, wherein the multiple second partitions are revised based on a capacity requirement of a number of the user equipment being greater than a total number of user equipment that can be multiplexed in all resources of the partitioned sounding reference signal resource space.

9. The method of item 1, wherein the portioning scheme comprises a complete partitioning portioning scheme.

10. The method of item 9, wherein:
the sounding reference signal resource space is partitioned into a plurality of partitions based on a number of possible sounding reference signal bandwidths; and
allocating further comprises, from one of the partitions corresponding to a selected sounding reference signal bandwidth associated with a selected one of the plurality of the user equipment, selecting and allocating for the selected user equipment a set of sounding reference signal resources that has a smallest number of user equipment having previously allocated sounding reference signal bandwidths that are the same, subject to a limit on a maximum number of identical bandwidth user equipment configured per sounding reference signal resource.

11. The method of item 10, wherein allocating further comprises, if no sounding reference signal resources are available at the selected sounding reference signal bandwidth for the selected user equipment, using a maximum possible sounding reference signal bandwidth less than the selected sounding reference signal bandwidth for which an sounding reference signal resource allocation is found and allocating a set of sounding reference signal resources corresponding to the found allocation.

12. The method of any one of items 9 to 11, further comprising:
determining a distribution of pathloss sounding reference signal bandwidths of user equipment, the pathloss sounding reference signal bandwidths based on pathloss of individual ones of the user equipment;
partitioning, in the sounding reference signal resource space, a number of sounding reference signal resources for each possible sounding reference signal bandwidth in approximately a same ratio of the distribution of the pathloss bandwidths.

13. The method of item 12, wherein partitions of the partitioned sounding reference signal resource space are revised based on a capacity requirement of a number of the user equipment being greater than a total number of user equipment that can be multiplexed in all resources of the partitioned sounding reference signal resource space.

14. The method of item 11, wherein the sounding reference signal resource space further comprises a partition reserved for load balancing, and wherein allocating further comprises, if a set of sounding reference signal resources is still not available after using the maximum possible sounding reference signal bandwidth, allocating, if available, a set of sounding reference signal resources from the load balancing partition.

15. The method of item 14, wherein allocating further comprises, if no sounding reference signal resources are available in the load balancing partition at a selected bandwidth for the selected user equipment, using a maximum possible sounding reference signal bandwidth less than the selected bandwidth for which an sounding reference signal resource allocation can be found, and allocating a set of sounding reference signal resources corresponding to the found allocation.

16. The method of item 9, wherein:
the sounding reference signal resource space is partitioned into a plurality of partitions based on a number of possible sounding reference signal bandwidths;
the sounding reference signal space comprises a plurality of resource blocks corresponding to a plurality of dimensions comprising subframe offset; and
allocating further comprises configuring the sounding reference signal resources of a selected one of the plurality of partitions in as many subframe offsets as possible.

17. The method of item 1, wherein the portioning scheme comprises one of a load balancing portioning scheme, a complete partitioning portioning scheme; or a hybrid portioning scheme, and wherein the method further comprises selecting which of the one scheme to use based at least on loading caused by the user equipment.

18. The method of any one of the preceding items, wherein the sounding reference signal space comprises a plurality of resource blocks corresponding to a plurality of dimensions comprising subframe offset, frequency offset, transmission comb, and cyclic shift.

19. The method of any one of the preceding items, wherein the indications further comprise indications of one or more of the following: subframe offset; periodicity; transmission comb; frequency offset; cyclic shift; or sounding reference signal bandwidth.

20. The method of any one of the preceding items, further comprising receiving sounding reference signals from the plurality of user equipment based at least in part on corresponding allocated sets of the sounding reference signal resources.

21. An apparatus configured to perform the method as recited in any one of the items 1 to 20.

22. A computer program product comprising program instructions to cause an apparatus to perform method as recited in any one of items 1 to 20.

An apparatus comprising: one or more processors; and one or more memories including computer program code, the one or more memories and the computer program code configured to, with the one or more processors, cause the apparatus to perform the method as recited in any one of items 1 to 20.

An apparatus comprising means for performing the method as recited in any one of the items 1 to 20.

A computer program product comprising a computer-readable storage medium bearing computer program code embodied therein for use with a computer, the computer program code comprising code for performing the method as recited in any one of items 1 to 20.

Without in any way limiting the scope, interpretation, or application of the claims appearing below, a technical effect of one or more of the example embodiments disclosed herein is to allocate SRS resources to UEs using a portioning scheme. Another technical effect of one or more of the example embodiments disclosed herein is to allocate SRS resources to UEs using load balancing. Another technical effect of one or more of the example embodiments disclosed herein is to allocate SRS resources to UEs using complete partitioning. Another technical effect of one or more of the example embodiments disclosed herein is to allocate SRS resources to UEs using a combination of load balancing and complete partitioning. Another technical effect of one or more of the example embodiments disclosed herein is to allocate SRS resources to UEs to limit an amount of user equipment having same or different assigned sounding reference signal bandwidths allocated to a same set of sounding reference signal resources.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

We claim:
1. A method comprising:
allocating a set of sounding reference signal resources in a sounding reference signal resource space to a plurality of user equipment using a portioning scheme; and
signaling indications of the allocated set of sounding reference signal resources to the plurality of user equipment,
wherein the portioning scheme comprises one of a load balancing portioning scheme, a complete partitioning portioning scheme; or a hybrid portioning scheme, and wherein the method further comprises selecting which one of the schemes to use based at least on loading caused by the user equipment.

2. The method of claim 1, wherein the portioning scheme comprises a load balancing portioning scheme.

3. The method of claim 2, wherein allocating further comprises allocating, from those sounding reference signal resources where only user equipment having a same sounding reference signal bandwidth have been allocated from the sounding reference signal resource space or those sounding reference signal resources that are not allocated at all from the sounding reference signal resource space, a set of sounding reference signal resources, for a selected one of the plurality of user equipment and from the sounding reference signal resource space, that has a smallest number of user equipment having the same sounding reference signal bandwidths.

4. The method of claim 2, wherein the sounding reference signal resource space is partitioned into a first partition for load balancing and multiple second partitions for complete partitioning, and wherein allocating further comprises allocating a set of sounding reference signal resources for a selected one of the plurality of user equipment from one of the multiple second partitions unless no suitable set of sounding reference signal resources is found, and responsive to no suitable set of sounding reference signal resources being found in one of the multiple second partitions, allocating a set of sounding reference signal resources for the selected user equipment from the load balancing partition.

5. The method of claim 4, wherein:
the multiple second partitions are partitioned based on a number of possible sounding reference signal bandwidths; and
allocating further comprises, from one of the second partitions corresponding to a selected sounding reference signal bandwidth associated with the selected user equipment, selecting and allocating for the selected user equipment a set of sounding reference signal resources that has a smallest number of user equipment having previously allocated sounding reference signal bandwidths that are the same, subject to a limit on a maximum number of identical bandwidth user equipment configured per sounding reference signal resource.

6. The method of claim 4, further comprising:
determining a distribution of path loss sounding reference signal bandwidths of user equipment, the path loss sounding reference signal bandwidths based on path loss of individual ones of the user equipment; and
determining the multiple second partitions at least by partitioning, in the sounding reference signal resource space, a number of sounding reference signal resources for each possible sounding reference signal bandwidth in approximately a same ratio of the distribution of the path loss bandwidths.

7. The method of claim 6, wherein the multiple second partitions are revised based on a capacity requirement of a number of the user equipment being greater than a total number of user equipment that can be multiplexed in all resources of the partitioned sounding reference signal resource space.

8. The method of claim 1, wherein the portioning scheme comprises a complete partitioning portioning scheme.

9. The method of claim 8, wherein:
the sounding reference signal resource space is partitioned into a plurality of partitions based on a number of possible sounding reference signal bandwidths; and
allocating further comprises, from one of the partitions corresponding to a selected sounding reference signal bandwidth associated with a selected one of the plurality of the user equipment, selecting and allocating for the selected user equipment a set of sounding reference signal resources that has a smallest number of user equipment having previously allocated sounding reference signal bandwidths that are the same, subject to a limit on a maximum number of identical bandwidth user equipment configured per sounding reference signal resource.

10. The method of claim 9, wherein allocating further comprises, if no sounding reference signal resources are available at the selected sounding reference signal bandwidth for the selected user equipment, using a maximum possible sounding reference signal bandwidth less than the selected sounding reference signal bandwidth for which an sounding reference signal resource allocation is found and allocating a set of sounding reference signal resources corresponding to the found allocation.

11. The method of claim 10, wherein the sounding reference signal resource space further comprises a partition reserved for load balancing, and wherein allocating further comprises, when a set of sounding reference signal resources is still not available after using the maximum possible sounding reference signal bandwidth, allocating, when available, a set of sounding reference signal resources from the load balancing partition.

12. The method of claim 11, wherein allocating further comprises, if no sounding reference signal resources are available in the load balancing partition at a selected bandwidth for the selected user equipment, using a maximum possible sounding reference signal bandwidth less than the selected bandwidth for which an sounding reference signal resource allocation can be found, and allocating a set of sounding reference signal resources corresponding to the found allocation.

13. The method of claim 8, further comprising:
determining a distribution of path loss sounding reference signal bandwidths of user equipment, the path loss sounding reference signal bandwidths based on path loss of individual ones of the user equipment;
partitioning, in the sounding reference signal resource space, a number of sounding reference signal resources for each possible sounding reference signal bandwidth in approximately a same ratio of the distribution of the path loss bandwidths.

14. The method of claim 13, wherein partitions of the partitioned sounding reference signal resource space are revised based on a capacity requirement of a number of the user equipment being greater than a total number of user equipment that can be multiplexed in all resources of the partitioned sounding reference signal resource space.

15. The method of claim 8, wherein:
the sounding reference signal resource space is partitioned into a plurality of partitions based on a number of possible sounding reference signal bandwidths;
the sounding reference signal space comprises a plurality of resource blocks corresponding to a plurality of dimensions comprising subframe offset; and
allocating further comprises configuring the sounding reference signal resources of a selected one of the plurality of partitions in as many subframe offsets as possible.

16. The method of claim 1, wherein the sounding reference signal space comprises a plurality of resource blocks corresponding to a plurality of dimensions comprising subframe offset, frequency offset, transmission comb, and cyclic shift.

17. The method of claim 1, wherein the indications further comprise indications of one or more of the following: subframe offset; periodicity; transmission comb; frequency offset; cyclic shift; or sounding reference signal bandwidth.

18. The method of claim 1, further comprising receiving sounding reference signals from the plurality of user equipment based at least in part on corresponding allocated sets of the sounding reference signal resources.

19. A computer program product comprising a non-transitory computer-readable storage medium bearing computer program code embodied therein for use with a computer, the computer program code comprising code for performing the method as recited in claim 1.

20. An apparatus comprising:
one or more processors; and
one or more memories including computer program code, the one or more memories and the computer program code configured, with the one or more processors, to cause the apparatus to perform at least the following:

allocating a set of sounding reference signal resources in a sounding reference signal resource space to a plurality of user equipment using a portioning scheme; and signaling indications of the allocated set of sounding reference signal resources to the plurality of user equipment, wherein the portioning scheme comprises one of a load balancing portioning scheme, a complete partitioning portioning scheme; or a hybrid portioning scheme, and wherein the method further comprises selecting which one of the schemes to use based at least on loading caused by the user equipment.

21. The apparatus of claim 20, wherein the portioning scheme comprises a load balancing portioning scheme.

22. The apparatus of claim 20, wherein the portioning scheme comprises a complete partitioning portioning scheme.

* * * * *